United States Patent [19]

Chen et al.

[11] Patent Number: 4,583,818
[45] Date of Patent: Apr. 22, 1986

[54] OPTICAL DEVICE WITH SURFACE PLASMONS

[75] Inventors: Yung-Jui Chen, Weston; Gary M. Carter, Lexington; William H. McNeill, Carlisle, all of Mass.

[73] Assignee: GTE Laboratories Incorporated, Waltham, Mass.

[21] Appl. No.: 521,512

[22] Filed: Aug. 8, 1983

[51] Int. Cl.$^4$ ............................................. G02B 6/34
[52] U.S. Cl. ............................ 350/96.19; 350/96.12; 350/162.24
[58] Field of Search ............... 350/96.11, 96.12, 96.15, 350/96.19, 162.24

[56] References Cited

U.S. PATENT DOCUMENTS

| | | | |
|---|---|---|---|
| 3,796,999 | 3/1974 | Kahn | 350/351 X |
| 3,942,048 | 3/1976 | Laude et al. | 350/162.24 X |
| 4,329,016 | 5/1982 | Chen | 350/96.12 |

OTHER PUBLICATIONS

"Integrated Optical Coupler" by Galeener et al., Xerox Disclosure Journal, vol. #4, No. 3, May/Jun. 1979.
"Measurement of Third Order Nonlinear Susceptibilities by Surface Plasmons" by Chen et al., Appl. Phys. Lett. 41(4), Aug. 15, 1982.
"Optical Bistability with Surface Plasmons" by Wysin et al., Optical Society of America, Jan. 1981, Optical Letters.
"Optical Constants of the Noble Metals" by Johnson et al., Physical Review B, vol. 6, No. 12, Dec. 15, 1972.
Theory of Hysteresis Reflection and Refraction of Light by a Boundary of a Nonlinear Medium, by Kaplan, Sov. Phys. JEPT 45(5), May 1977.

Primary Examiner—William L. Sikes
Assistant Examiner—Akm E. Ullah
Attorney, Agent, or Firm—Fred Fisher

[57] ABSTRACT

An optical device used as an optical switch or bistable device, with surface plasmons, is comprised of a semiconductor base material forming a non-linear dielectric layer along with a metal layer, with an interface between the metal and semiconductor layers including a submicron grating. The device is optically excited from a light source of given intensity. In accordance with the invention, dispersion relation of surface plasmons may be changed by varying the intensity of an input laser so as to provide bistable or hysteresis effect switching. The concepts of the invention may be implemented in either an unadorned device as set forth, or may be fabricated in an optical waveguide.

15 Claims, 7 Drawing Figures

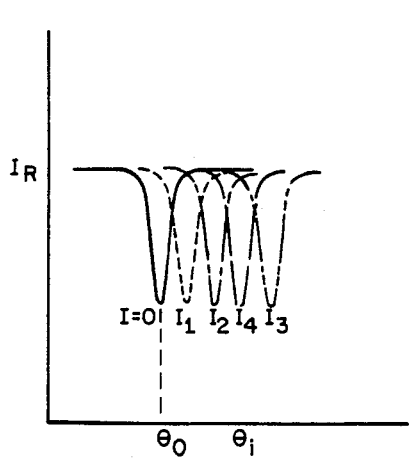
Fig. 3A
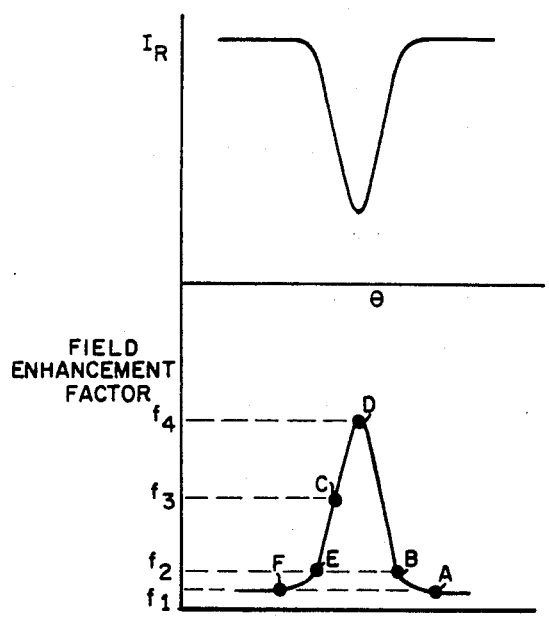
Fig. 3B
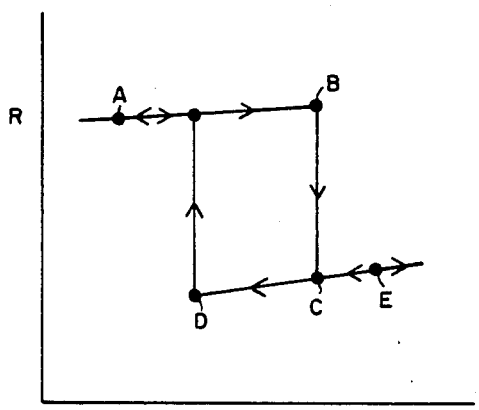
Fig. 4
Fig. 5
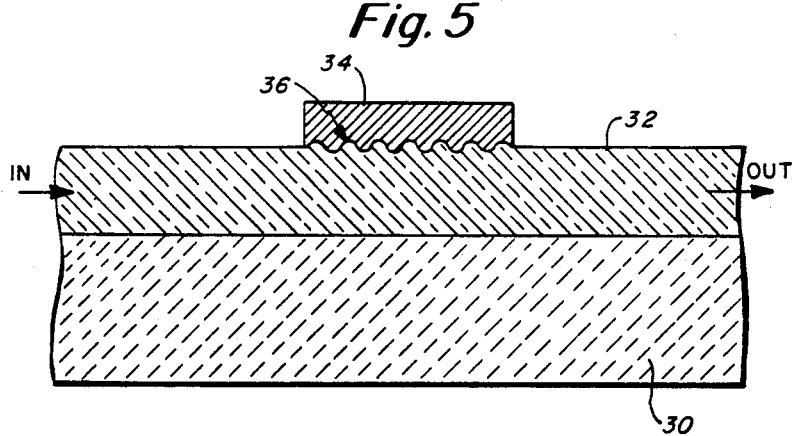

OPTICAL DEVICE WITH SURFACE PLASMONS

BACKGROUND AND SUMMARY OF THE INVENTION

The present invention relates in general to optical devices, and pertains, more particularly, to optical switching and/or bistable devices. Even more particularly, the present invention is concerned with a novel technique by which one can change the dispersion relation of surface plasmons at a metal-non-linear dielectric interface by varying the input laser intensity incident upon the device.

Optical bistability in reflection has been examined recently with considerable interest. See, for example, the article entitled "Optical Bistability With Surface Plasmons" by G. M. Wysin, H. J. Simon, and R. T. Deck from Optics Letters, Volume 6, No. 1, pages 30–32, January, 1981. The theory of hysteresis reflection by the boundary of a non-linear medium at grazing-angle incidence was first proposed by Kaplan in the article "Theory of Hysteresis Reflection and Refraction of Light by a Boundary of a Non-Linear Medium" by A. E. Kaplan, Sov. Phys., JEPT 45, 896 (1977). In the article "Bistability at a Non-Linear Interface" by P. W. Smith, et al, Applied Physics Letters, 35, 846 (1979), there has been demonstrated optical bistability in reflection at the boundary between a linear glass medium and $CS_2$, a non-linear (Kerr effect) medium. Herein, when reference is made to a surface-plasmon mode, this refers to an evanescent transverse-magnetic (TM) wave that propagates along an interface between a medium with a negative dielectric constant, such as a metal, and a medium with a positive dielectric constant.

In the aforementioned article, "Optical Bistability With Surface Plasmons" by G. M. Wysin, et al, the bistable device is fabricated by considering an interface between a metal and Kerr non-linear medium with a positive-intensity-dependent index of refraction. The surface-plasmon mode is excited in the Kretschmann configuration with the use of a prism along with a metallic layer which may be a silver film, and a dielectric layer which is a non-linear dielectric. In this same connection, also refer to three papers presented at the 11th International Quantum Electronics Conference in Boston, Jun. 23–26, 1980, papers T8, T9 and T10, pages 657–659. The papers cited are Smith, et al, "Optical Stability and Switching at a Non-Linear Interface", (T8); Smith, et al, "Waveguide Non-Linear Interface Device"—(T9); and Kaplan, "Bistable Reflection of Light From the Boundary of an Artificial Non-Linear Medium"—(T10).

Although, from a theoretical standpoint, the prism may be convenient to use in the aforementioned Kretschmann configuration for surface-plasmon excitation, from a practical standpoint, the prism is not advantageous in actual use in that there is a requirement that the prism be of a different material than both the metal and the dielectric materials and has to have a relatively large index of refraction. This provides an extreme limitation on the prism material and makes it difficult from a practical standpoint to find desirable materials that can be used. Also, in the prism-metal-dielectric arrangement, there are three separate materials that are used and, particularly for strong light intensities, this makes precise control more difficult because of the use of three materials rather than two.

Accordingly, it is an object of the present invention to provide an optical bistable device with surface plasmons in which the device is fabricated primarily only of two materials which include the metal film and non-linear dielectric.

To accomplish the foregoing and other objects of the invention, there is provided an optical bistable device that comprises a non-linear optical material that forms a non-linear dielectric layer. For example, this dielectric layer may be of silicon or gallium arsenide. The optical device also includes an optically thick metal layer and an interface between the metal and non-linear dielectric layers including a sub-micron grating. This sub-micron grating is typically fabricated on the semiconductor surface and the metal layer is then deposited thereover. Means are provided for optically exciting the device from a light source of given intensity. The device operates on the principle of variation of the dispersion relation of surface plasmons as a function of incident intensity and is characterized by hysteresis type bistable operation.

BRIEF DESCRIPTION OF THE DRAWINGS

Numerous other objects, features and advantages of the invention should now become apparent upon a reading of the following detailed description, taken in conjunction with the accompanying drawing, in which:

FIG. 3A illustrates the principles of the optical bistable device and is a plot of reflected intensity versus incident angle showing a family of curves associated with different input laser intensities;

FIG. 3B shows plots of reflected intensity and field enhancement factor as a function of the incident angle;

FIG. 4 is a further plot showing the relationship of reflected intensity versus input intensity and demonstrating the optically switching effect (hysteresis effect); and FIG. 5 shows the device of the present invention as built into a waveguide system.

DETAILED DESCRIPTION

It has been shown that the dispersion relation of surface plasmons at a metal - non-linear dielectric interface may be changed by means for varying the input laser intensity.

Figure 1:
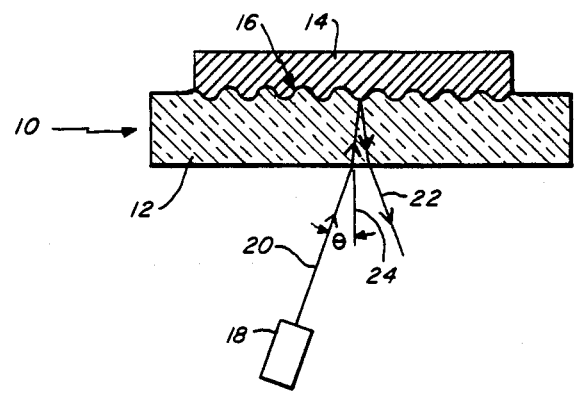
FIG. 1 depicts an optical bistable device constructed in accordance with the principles of the invention.

FIG. 1 shows an optical device 10 with which the principles of the present invention are associated. This device includes a semiconductor non-linear dielectric material 12 and a metal material 14 with an interface 16 in the form of a submicron grating structure which is fabricated on the semiconductor surface as indicated. Experiments have been performed using a metal-semiconductor system of, for example, Ag-Si and Ag-GaAs. FIG. 1 also shows a laser source 18 and associated incident wave indicated by arrow 20 and associated reflective wave indicated by arrow 22. It is noted that the incident wave is at an angle $\theta$, which is an angle measured from the normal line 24.

Figure 2A:
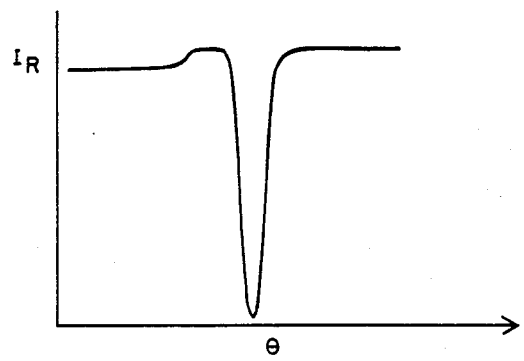
FIG. 2A is a plot of reflected intensity versus incident angle and associated with the device of FIG. 1.
Figure 2B:
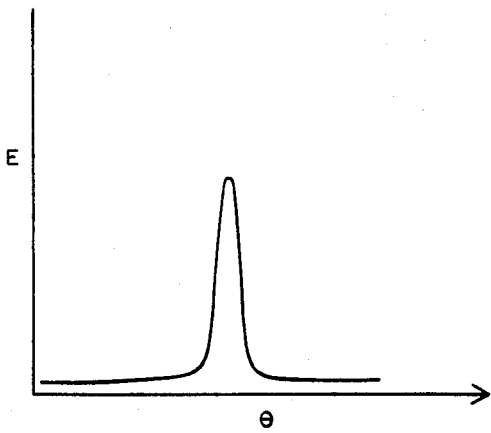
FIG. 2B is a plot of field strength at the interface versus incident angle and also associated with the device of FIG. 1.

By varying the angle of the incident light at a given laser intensity, a reflection spectrum as illustrated in FIG. 2A is obtained. FIG. 2A is a plot of incident wave angle versus reflected intensity I. The angular location of the minimum point of the reflected intensity corresponds to the condition of coupling to the surface plasmon $$\left(\text{i.e. } k_{sp}(\omega) = \left(\frac{\omega}{c}\right) \sin\theta + \frac{n2\pi}{a}\right)$$

via an nth order grating diffraction. The width of the reflection spectrum corresponds to the loss of the system (the dielectric loss of the metal and the semiconductor, and the radiation loss due to the grating diffraction). The drop of the reflected intensity in FIG. 2A is due to the large increase of the field strength at the metal-semiconductor interface 16 (FIG. 1) as shown in FIG. 2B and, hence, the large increase of both the dielectric loss and the radiative loss. As the input laser intensity is increased, an angular shift of the reflection spectrum is observed. The shift of the minimum position can be readily explained by the change of the dielectric constant of the semiconductor due to the input laser intensity given by the formula: $\epsilon = \epsilon_1 + 4\pi\chi^{(3)}E^2$, where $\epsilon_1$ is the dielectric constant of the semiconductor at low (zero) field; $\chi^{(3)}$ is the third order nonlinear susceptibility of the semiconductor and E is the composite laser field amplitude at the metal-semiconductor interface.

Taking the case of a metal (M) - semiconductor (S) single-interface configuration, the dispersion condition of the surface plasmon may be written as follows:

$$k_{sp}(\omega) = \frac{\omega}{c} \sqrt{\frac{\epsilon_M \epsilon_S}{\epsilon_M + \epsilon_S}},$$

where $\epsilon_M$ and $\epsilon_S$ are the dielectric constants of the metal and semiconductor, respectively, and $K_{sp}(\omega)$ is the wavevector of the surface plasmon parallel to the interface. By substituting the field-dependent dielectric function for $\epsilon_S$, and assuming $\chi^{(3)}E^2 << \epsilon_1$, the field-dependent dispersion condition for the surface plasmon is obtained as follows:

$$k_{sp}(\omega, I) \approx \frac{\omega}{c} \sqrt{\frac{\epsilon_M \epsilon_1}{\epsilon_M + \epsilon_1}} \left(1 + \frac{2\pi\chi^{(3)}}{\epsilon_1} E^2\right)$$

$$\equiv k_{sp}^0(\omega) \left(1 + \frac{2\pi\chi^{(3)}E^2}{\epsilon_1}\right)$$

It is noted that the field-induced change of $k_{sp}$ is approximately linearly proportional to the laser intensity $E^2$. The direction of the shift depends on the relative sign between the dielectric constant $\epsilon_1$ and the third order non-linear susceptibility $\chi^{(3)}$ of the semiconductor.

The principles described hereinabove may be used in the measurement and study of third order non-linear susceptibility in connection with various types of materials. In this regard, reference is made to the article "Measurement of Third Order Non-Linear Susceptibilities by Surface Plasmons" by Y. J. Chen and G. M. Carter, Appl. Phys. letter 41 (4) pages 307-309, 15 August, 1982. These principles also have application for optical switching or bistable devices, the principles of which are now described in detail herein.

The principles of the optically bistable devices are demonstrated by assuming that the semiconductor has a positive third order non-linear susceptibility $\chi^{(3)}$ (relative to the semiconductor dielectric constant $\epsilon_1$) and by setting the incident angle $\theta_i$ away from the resonant coupling region, as snown in FIG. 3A. Herein, input laser intensity is represented by i; laser intensity at the interface is represented by I ($I \propto E^2$). Also, $I = f * i$, where f is the coupling factor of the optical device. In this regard, refer to the plot of FIG. 3B of field enhancement factor versus incident angle. It is also noted in the above discussion that $f > 1$ (i.e. the field at the interface is enhanced) at the resonant coupling region and $f < 1$ outside the resonant coupling region.

As the input laser intensity i is increased, the reflected dispersion spectrum shifts toward angle $\theta_i$. When i is increased to $i_2$, I increases to $I_2 = f_2 * i_2$, $\theta_i$ moves into the resonance region and the field strength of the interface is enhanced (point B in FIG. 3B) which shifts the dispersion spectrum further toward the higher angle. The positive feedback effect shifts the minimum of the dispersion spectrum beyond angle $\theta_i$ and finally the dispersion spectrum reaches a new equilibrium condition where $I_3 = i_2 * f_3$ (point C in FIG. 3B). Any increase of intensity moves the dispersion spectrum very little, as the increase of input intensity i will be compensated by the decrease of field enhancement factor f and leaves the intensity at the interface virtually unchanged. The relationship of reflected intensity versus input intensity is shown in FIG. 4. This demonstrates the optically switching effect (hysteresis effect).

Still, with reference to FIGS. 3A, 3B and 4, when the laser intensity is decreased, the reflected dispersion spectrum shifts very little (toward the lower angle). This is because, as the input intensity is lowered, the angle $\theta_i$ moves back into resonance, and the increase of the field enhancement factor f compensates for the decrease of the input intensity i and leaves the intensity I unchanged (positive feedback). When, $I = I_4$, $\theta_i$ is sitting at the minimum of the reflected spectrum and the device is operated at the maximum field enhancement condition. This is noted in FIG. 3B as point D. Furthermore, this same point D is also illustrated in FIG. 4. With any further decrease of the laser intensity, the angle $\theta_i$ moves away from the resonance area and the field enhancement factor has to drop. This further reduces the field intensity at the interface and thus shifts the reflected spectrum even more (negative feedback) and the reflected intensity recovers. In this connection, note the points E and F in FIGS. 3B and 4. Again, the relationship of reflected intensity versus input intensity is shown in FIG. 4, and it is noted that there is provided the optical hysteresis which demonstrates the optical bistable characteristics of the device.

To achieve the switching effect noted in FIG. 4, with a small change of input light intensity, it is preferred to set the incident angle $\theta_i$ very close to the resonant coupling region. Also, to achieve an appreciable bistable effect, it is preferred to optimize the grating feedback effect.

The concepts of the present invention may be implemented in various configurations. One configuration is depicted in FIG. 1 in which the device is essentially a "stand-alone" device, as depicted, including the non-linear dielectric layer 12 and the metal layer 14. The non-linear layer may be of a semiconductor and the metal layer may be of silver. FIG. 5 illustrates another implementation in which the device is fabricated in association with an optical waveguide. In this connection, the concepts of the present invention are in particular, compatible with integrated optics.

Now, with reference to FIG. 5, there is shown a device in accordance with the present invention, built into a waveguide system. There is thus provided a base substrate 30 upon which is formed the optical waveguide 32. Disposed over the optical waveguide 32 is the metal layer 34. The grating interface 36 is shown in FIG. 5 between the optical waveguide 32 and the metal layer 34. The metal layer 34 may be of, for example, silver. The grating 36 illustrated in FIG. 5 is a submicron grating.

In either the embodiment of FIG. 1 or the embodiment of FIG. 5, the grating interface may be formed by edging the semiconductor such as by using an MBE technique. To operate at the one micron wavelength region, the grating structure may have a periodicity on the order of 0.3 micron and the thickness of the grating may be on the order of 0.1 micron and preferably is in the range of 0.025 micron to 0.25 micron.

One of the important features of the present invention, particularly in comparison with the prior used prism structures, is that the present device is a single interface device. Thus, the device can be quite easily fabricated and aligned in practice. Furthermore, the device can be readily implemented in solid and thin film materials. The gain of the device (or the Q factor of the resonator) may be readily adjusted by changing either or all of the following parameters: the metal and non-linear dielectric materials, the grating amplitude, the grating shape, and the grating spacing. The device of the present invention is relatively broadband. It can be operated for a large range of wavelengths.

Having now described a limited number of embodiments of the invention, it should be apparent to those skilled in the art that numerous other embodiments and modifications thereof are contemplated as falling within the scope of the present invention as defined by the appended claims:

What is claimed is:

1. In combination an optical bistable device comprising
    a non-linear dielectric layer, and
    a metal layer in communication with said dielectric layer, forming an interface between said metal layer and said non-linear dielectric layer, said interface including a submicron grating; and
    means for optically exciting said device from a light source of given intensity.

2. An optical bistable device as set forth in claim 1 wherein said non-linear dielectric layer comprises a semiconductor material including silicon.

3. An optical bistable device as set forth in claim 1 wherein said non-linear dielectric layer comprises a semiconductor material including a compound semiconductor.

4. An optical bistable device as set forth in claim 1 wherein said metal layer comprises a noble metal.

5. An optical bistable device as set forth in claim 4 wherein said metal layer comprises silver.

6. An optical bistable device as set forth in claim 1 wherein said submicron grating has a periodicity in the range of 0.2 micron to 1 micron.

7. An optical bistable device as set forth in claim 1 wherein said grating has a grating amplitude is in the range of 0.02 micron to 0.2 micron.

8. An optical bistable device as set forth in claim 1 wherein said grating has a square wave configuration.

9. An optical bistable device as set forth in claim 1 wherein said grating has a substantially sinusoidal configuration.

10. An optical bistable device as set forth in claim 1 wherein said grating has a linear dimension on the order of 1 micron.

11. An optical bistable device as set forth in claim 1 wherein said grating has a linear dimension in the range of 0.1 micron to 10 microns.

12. An optical bistable device as set forth in claim 1 wherein said semiconductor material comprises an optical waveguide and associated substrate with said grating being formed on said optical waveguide and with said metal layer disposed thereover.

13. An optical bistable device as set forth, in claim 1 wherein said submicron grating is formed on said semiconductor material with the metal layer being deposited thereover.

14. An optical bistable device as set forth in claim 1 wherein said non-linear dielectric layer comprises a semiconductor material.

15. An optical bistable device as set forth in claim 14 wherein said semiconductor material comprises a compound semiconductor such as gallium arsenide.

* * * * *